Aug. 22, 1933.  J. MEISSNER  1,923,993
PROCESS AND APPARATUS FOR THE UNINTERRUPTED PRODUCTION OF ALKALINE AZIDS
Filed Sept. 29, 1931
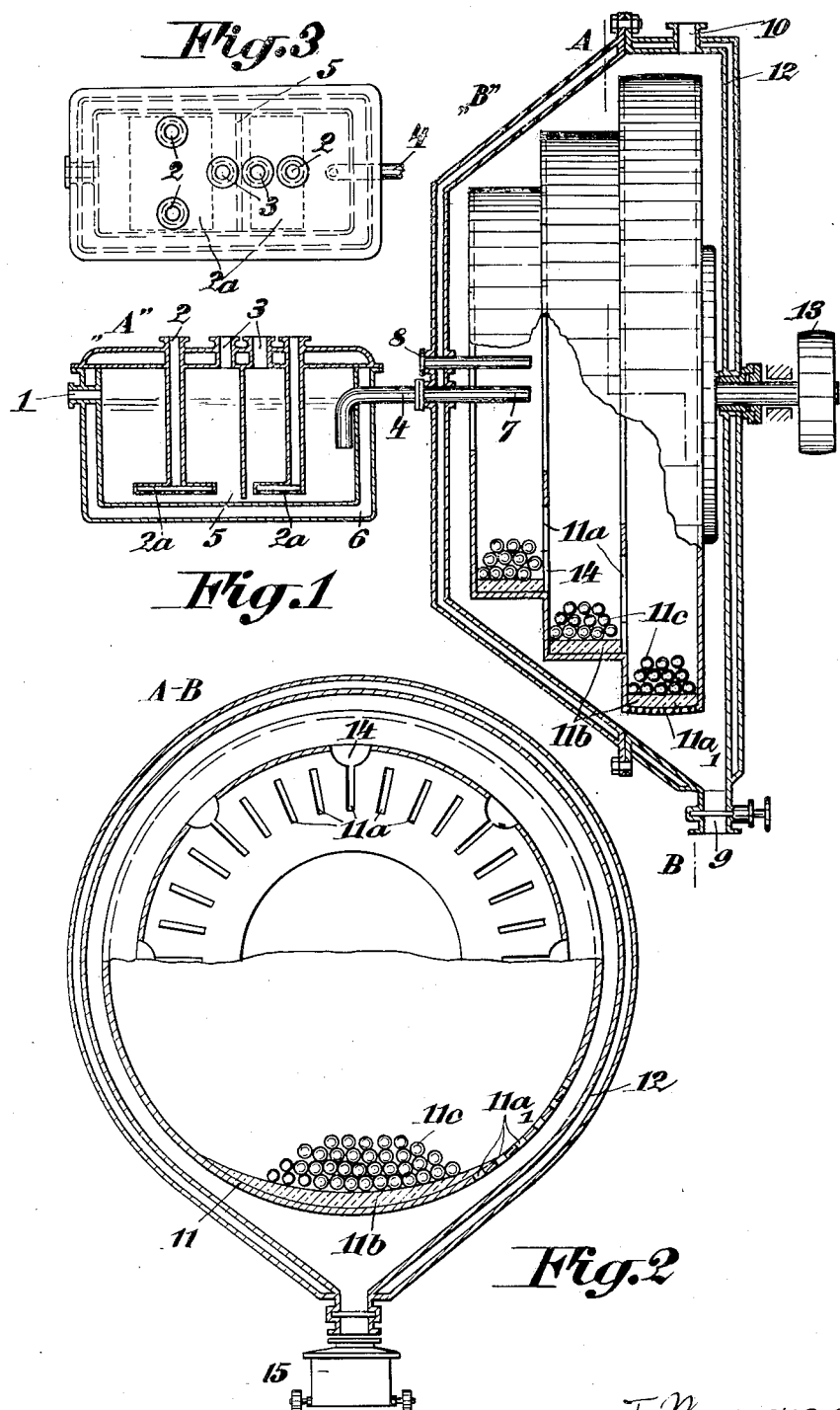

Patented Aug. 22, 1933

1,923,993

UNITED STATES PATENT OFFICE 1,923,993

PROCESS AND APPARATUS FOR THE UNINTERRUPTED PRODUCTION OF ALKALINE AZIDS

Josef Meissner, Burbach, Germany

Application September 29, 1931, Serial No. 565,914, and in Germany November 10, 1930

2 Claims. (Cl. 23—191)

Heretofore alkaline azids have been produced periodically. I shall now describe by way of example the production of sodium azid.

Metallic sodium is charged into a reaction-vessel and heated to a temperature between 350° and 360° C. Ammonia gas is introduced into the melt whenever this temperature is reached. Now sodium amide and hydrogen is formed according to the formula $Na+NH_3=NaNH_2+H$. However at the beginning the sodium amide is formed very slowly, so that the complete reaction may take up from 8 to 10 hours in the event of charges from 10 to 15 kilogrammes. Further the ammonia gas has to be passed through the molten sodium for 1 to 2 hours before the reaction commences and usually this ammonia gas is lost.

The reaction is accelerated whenever the production of sodium amide has commenced and increases in accordance with the increasing formation of sodium amide. Experiments have shown that three quarters of the reaction period is necessary for forming the first 50% of sodium amide, while only a quarter of the reaction period is required for forming the remaining 50% of sodium amide.

After the sodium amide is formed, the charge is fed into a reaction-mill in which a temperature of 160° to 180° C. is maintained. The product is agitated and broken up in the mill and at the same time nitrogen monoxide is introduced to cause the following reaction:—

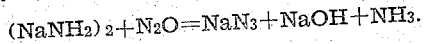
$(NaNH_2)_2+N_2O=NaN_3+NaOH+NH_3$.

The reaction of the sodium amide into sodium azid and sodium hydroxide in the reaction will by means of nitrogen monoxide proceed very slowly and calls for a great expenditure of nitrogen monoxide in the event of an interrupted process and if the whole charge is introduced and subjected to the reaction at a time. In the event of a charge of 20 to 25 kilogrammes sodium amide, the transformation into sodium azid needs 10 hours in the most unfavourable case. From 8 to 10 hours are necessary for the transformation even if smaller quantity of 8 to 10 kilogrammes are employed. This slow reaction calls for an excessive quantity of nitrogen monoxide, heating material and amount of work.

It has been discovered, that the interruptions of reaction and the loss of time, which are unavoidable in the case of the interrupted process, can be avoided when uninterruptedly carrying out the process.

In order to attain this object, the molten sodium is uninterruptedly fed into a reaction-tank for the production of sodium azid. In the course of its passage through the apparatus, the sodium mixes with the finished sodium amide and within 10 minutes is transformed into sodium amide by means of introduced ammonia gas. The reason for this extremely quick reaction is the continuous presence of 90 to 95 parts of finished sodium amide and of 10 to 5 parts of molten sodium only.

The speed and direction of flow through the tank is controlled by suitable obstructions. The finished molten sodium amide continuously leaves the reaction-tank and subsequently is introduced into a reaction drum mill, in which the product is broken up by suitable obstructions or balls and is transformed into sodium azid, sodium hydroxide by means of nitrogen monoxide.

The drum is constructed in such a manner, that sodium azid and nitrogen monoxide are uninterruptedly supplied, while sodium amide, sodium hydroxide and the waste gases are uninterruptedly discharged. Also in this case the reaction is carried out within a very short time (about 10 minutes) because only small quantities of sodium azid are admitted to sodium amide which already is in the state of reaction and has been transformed in sodium azid, so that a very high output can be attained with a small apparatus.

The advantages of the new process, compared with the known processes, are:—

1. Interruption of the production at any time,
2. Saving of raw materials because ammonia gas and nitrogen monoxide are practically completely transformed,
3. Saving of heating material because a long heating for starting the reaction is not necessary owing to the rapid reaction,
4. Greatest efficiency with a very small apparatus,
5. Saving of wages and power.

An apparatus for carrying out the process according to the present invention is illustrated by way of example on the accompanying sheet of drawing in which:—

Fig. 1 shows in sectional elevation a sodium amide tank A and a drum mill B for the production of sodium azid.

Fig. 2 shows in cross section the reaction drum mill and a discharge carriage.

Fig. 3 is a plan view of the amide tank.

In Fig. 1 designate 1 the inlet for the molten sodium, 2 the inlet for the ammonia gases, 2$^a$ the plates for distributing the ammonia gases, 3 the outlet for the waste gases, 4 the outlet for the finished sodium amide, 5 a baffle plate, 6 the heater, 7 the inlet for admitting the sodium amide to the drum, 8 the inlet for the nitrogen monoxide, 9 a valve-controlled outlet for the discharge of sodium azid-sodium hydroxide, 10 the outlet for the ammonia gas, 11 a stepped inner drum, 11$^a$ sieves in the latter, 11$^b$ the material under treatment, 11$^c$ the grinding balls, 12 the outer drum with heater and 13 the operating gear. In Fig. 2 designate 14 agitator-ribs, 15 the discharge carriage, 11$^a$ sieves of the grinding steps and 11$^{a1}$ the sieves of the discharge steps.

I claim:—

1. Process for the uninterrupted production of alkali azids by the uninterrupted production of alkali amide and the subsequent uninterrupted reaction of nitrogen monoxide, which process consists in the uninterrupted introduction of equivalent quantities of molten alkali metals and ammonia into a melt of finished alkali amide which always is present at an excess of 50%, and further allowing the nitrogen monoxide to act on the alkali amide in the presence of alkali azid and sodium hydroxide.

2. Apparatus for the uninterrupted production of alkali azids comprising a reaction-tank, baffle plates and a heater in the tank, said tank having an inlet for the admission of the liquid alkali metal and separate passages for the admission of ammonia, pipes in the tank for the discharge of the waste gases, a ball-mill for the transformation of the alkali amide into alkali azid, and an overflow passage connecting said tank with said mill for the discharge of the alkali amide from the former into the latter.

JOSEF MEISSNER.